(12) United States Patent
Kim

(10) Patent No.: US 11,830,281 B2
(45) Date of Patent: Nov. 28, 2023

(54) ELECTRONIC DEVICE INCLUDING A FINGERPRINT SENSOR

(71) Applicant: Samsung Electronics Co., Ltd., Suwon-si (KR)

(72) Inventor: Jinho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/873,655

(22) Filed: Jul. 26, 2022

(65) Prior Publication Data

US 2023/0047474 A1  Feb. 16, 2023

Related U.S. Application Data

(63) Continuation of application No. PCT/KR2022/010133, filed on Jul. 12, 2022.

(30) Foreign Application Priority Data

Aug. 12, 2021 (KR) ........................ 10-2021-0106491

(51) Int. Cl.
*G06V 40/13* (2022.01)
*G06V 40/12* (2022.01)
*G02B 3/08* (2006.01)

(52) U.S. Cl.
CPC ...... *G06V 40/1318* (2022.01); *G06V 40/1365* (2022.01); *G02B 3/08* (2013.01)

(58) Field of Classification Search
None
See application file for complete search history.

(56) References Cited

U.S. PATENT DOCUMENTS

| 10,388,689 | B2 | 8/2019 | Huang et al. |
| 10,410,033 | B2 | 9/2019 | He et al. |
| 10,599,908 | B2 | 3/2020 | Jung et al. |
| 10,956,705 | B2 | 3/2021 | Han et al. |
| 11,017,200 | B1 | 5/2021 | Wickboldt |

(Continued)

FOREIGN PATENT DOCUMENTS

| CN | 104537349 A | 4/2015 |
| CN | 107580709 A | 1/2018 |

(Continued)

OTHER PUBLICATIONS

International Search Report dated Oct. 20, 2022, issued in International Application No. PCT/KR2022/010133.

*Primary Examiner* — Joseph R Haley
(74) *Attorney, Agent, or Firm* — Jefferson IP Law, LLP

(57) ABSTRACT

An electronic device is provided. The electronic device includes a display panel, an image lens positioned under the display panel to form a fingerprint image by using light reflected from user fingerprints, an image sensor configured to convert an image into an electrical signal, a first aperture positioned on a first surface between the image lens and the image sensor to block a light component scattered on the display panel, a relay lens positioned between the first surface and the image sensor to collect light having passed through the first aperture to the image sensor, and a second aperture positioned on a second surface between the relay lens and the image sensor to block a light component scattered on the display panel.

18 Claims, 13 Drawing Sheets

(56) References Cited

U.S. PATENT DOCUMENTS

| | | |
|---|---|---|
| 11,275,922 B2 | 3/2022 | Du |
| 11,378,253 B2 | 7/2022 | Park et al. |
| 2013/0051637 A1* | 2/2013 | Kulcke .............. G06V 40/1324 |
| | | 382/124 |
| 2015/0138331 A1 | 5/2015 | Huang |
| 2019/0251326 A1 | 8/2019 | Sun |
| 2019/0303549 A1* | 10/2019 | Tanabe ................. G06F 1/1626 |
| 2022/0113831 A1* | 4/2022 | Hsueh ................ G06V 40/1318 |

FOREIGN PATENT DOCUMENTS

| | | |
|---|---|---|
| CN | 108427908 A | 8/2018 |
| CN | 109791612 A | 5/2019 |
| CN | 210572976 U | 5/2020 |
| CN | 211906313 U | 11/2020 |
| KR | 10-2018-0046788 A | 5/2018 |
| KR | 10-1855464 B1 | 6/2018 |
| KR | 10-2019-0075755 A | 7/2019 |

* cited by examiner

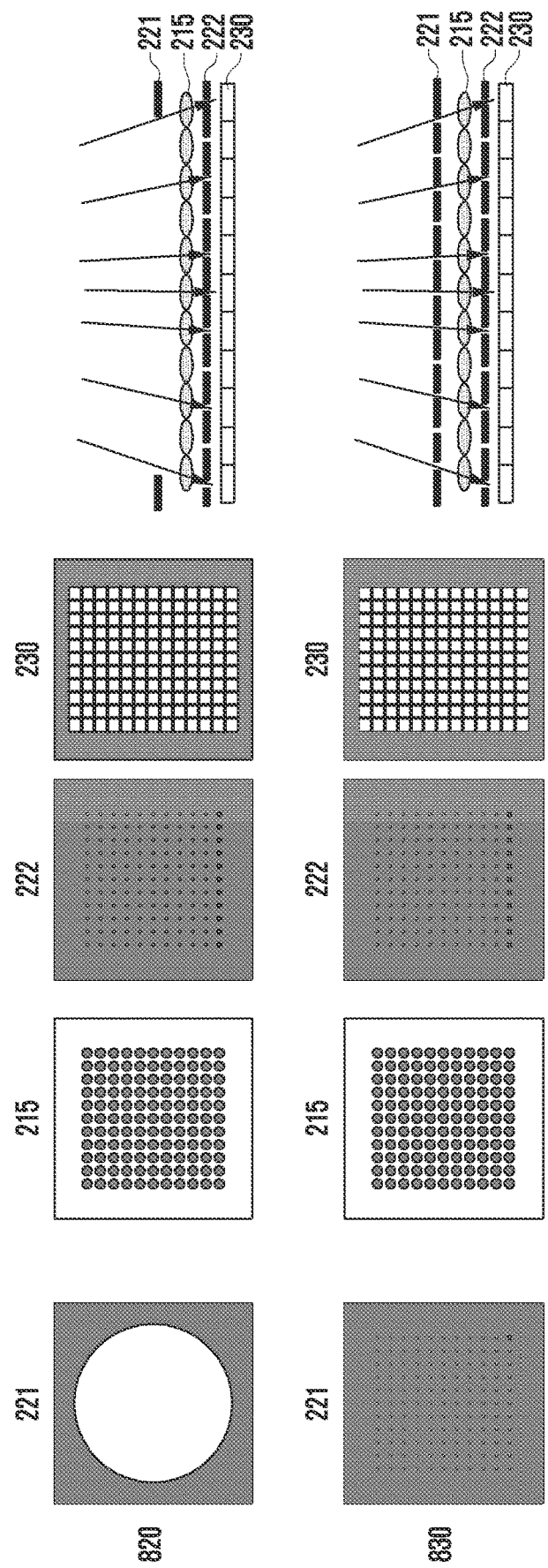

ELECTRONIC DEVICE INCLUDING A FINGERPRINT SENSOR

CROSS-REFERENCE TO RELATED APPLICATION(S)

This application is a continuation application, claiming priority under § 365(c), of an International application No. PCT/KR2022/010133, filed on Jul. 12, 2022, which is based on and claims the benefit of a Korean patent application number 10-2021-0106491, filed on Aug. 12, 2021, in the Korean Intellectual Property Office, the disclosure of which is incorporated by reference herein in its entirety.

TECHNICAL FIELD

The disclosure relates to an electronic device. More particularly, the disclosure relates to an electronic device including a fingerprint sensor.

BACKGROUND ART

Electronic devices have diversified functions and thus are implemented as multimedia players having multilayered functions such as functions for capturing photographs or videos, playing back music or video files, gaming, receiving broadcasts, and making calls. Such an electronic device includes a display and may display a screen related to functions based on the display.

Electronic devices have become able to execute various functions, and may store information related to users' personal life and/or information that requires security. For example, electronic devices may store not only information such as contacts, call particulars, or messages, but also various types of privacy information (or personal information) such as user location information, memo information, photographs, or financial transaction information. Therefore, electronic devices may perform various functions as a result of multi-functionality, but have the possibility of privacy infringement, personal information leak, or security vulnerability because users' privacy information is stored therein.

An electronic device may include various security functions for protecting the user's personal information or privacy information. The electronic device may use, as one of the various security functions, a scheme of authenticating user's biometric information. Examples of the scheme of using the user's biometric information may include a method of recognizing and detecting the user's fingerprint information by using a fingerprint sensor. The fingerprint authentication method can be easily implemented for electronic devices having a small form factor and has the merit of relatively high levels of accuracy and security, and thus is widely applied as authentication means of electronic devices.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

When a fingerprint sensor is disposed beneath a home button, the home button necessarily exists on the exterior of the electronic device, and this may place a restriction on configuring the exterior of the electronic device. For example, in the case of an electronic device using the entire front surface as a display (full front screen type), there may be no space for disposing the home button on the front surface of the electronic device. Therefore, it is necessary to dispose the fingerprint sensor beneath the display so as to acquire the user's fingerprint information.

When fingerprints are recognized in an optical type by using a fingerprint sensor disposed beneath the display of an electronic device, light inputted to the fingerprint sensor may entail noise unnecessary for fingerprint sensing, and the noise may degrade the fingerprint recognition ratio of the fingerprint sensor.

In addition to light emitted to and reflected by the user's finger, light scattered through the display panel may be directed together to an image sensor. The light scattered and directed to the image sensor may be incident upon the image sensor from all valley and ridge areas of the fingerprint, thereby degrading the signal to noise ratio (SNR) of the fingerprint image.

Aspects of the disclosure are to address at least the above-mentioned problems and/or disadvantages and to provide at least the advantages described below. Accordingly, an aspect of the disclosure is to provide an electronic device for structurally blocking light scattered from a display panel, thereby improving the fingerprint recognition ratio of the electronic device.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a display panel, an image lens positioned under the display panel to form a fingerprint image by using light reflected from user fingerprints, an image sensor configured to convert an image into an electrical signal, a first aperture positioned on a first surface between the image lens and the image sensor to block a light component scattered on the display panel, a relay lens positioned between the first surface and the image sensor to collect light having passed through the first aperture to the image sensor, and a second aperture positioned on a second surface between the relay lens and the image sensor to block a light component scattered on the display panel.

In accordance with another aspect of the disclosure, an electronic device is provided. The electronic device includes a memory configured to store user fingerprints and a processor operatively connected to the image sensor and the memory, and the processor may compare the user fingerprints stored in the memory and an image converted into an electrical signal by the image sensor so as to perform a fingerprint recognition process.

Advantageous Effects of Invention

Various embodiments may provide a display device capable of fingerprint recognition, which can reduce an internal optical noise signal that is input to an image sensor.

According to various embodiments, light scattered from a display panel may be structurally blocked, thereby improving the fingerprint recognition ratio of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 8B illustrates, as a cross-sectional view, the structure of an electronic device according to an embodiment of the disclosure;

The same reference numerals are used to represent the same elements throughout the drawings.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
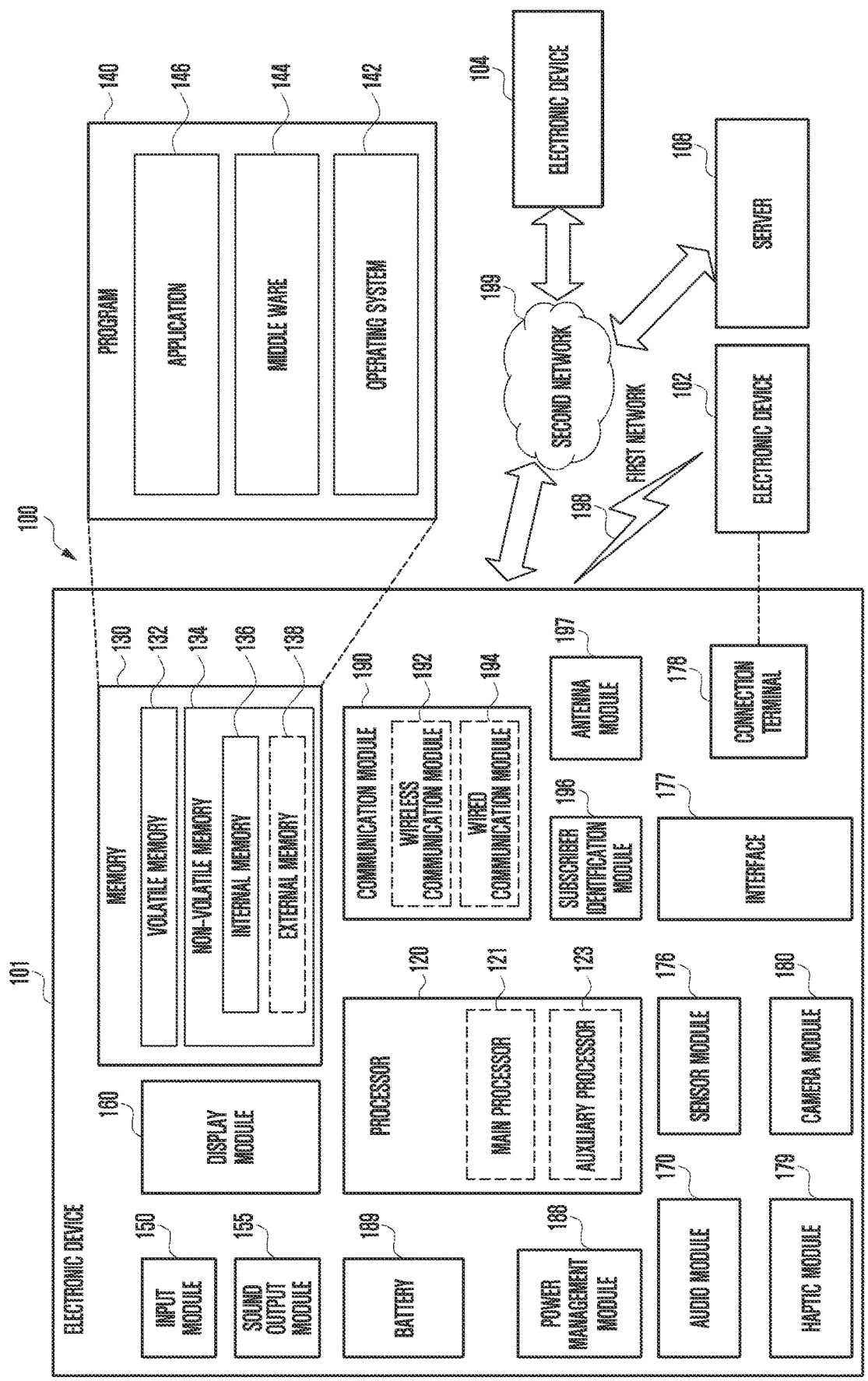
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5$^{th}$ Generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th Generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
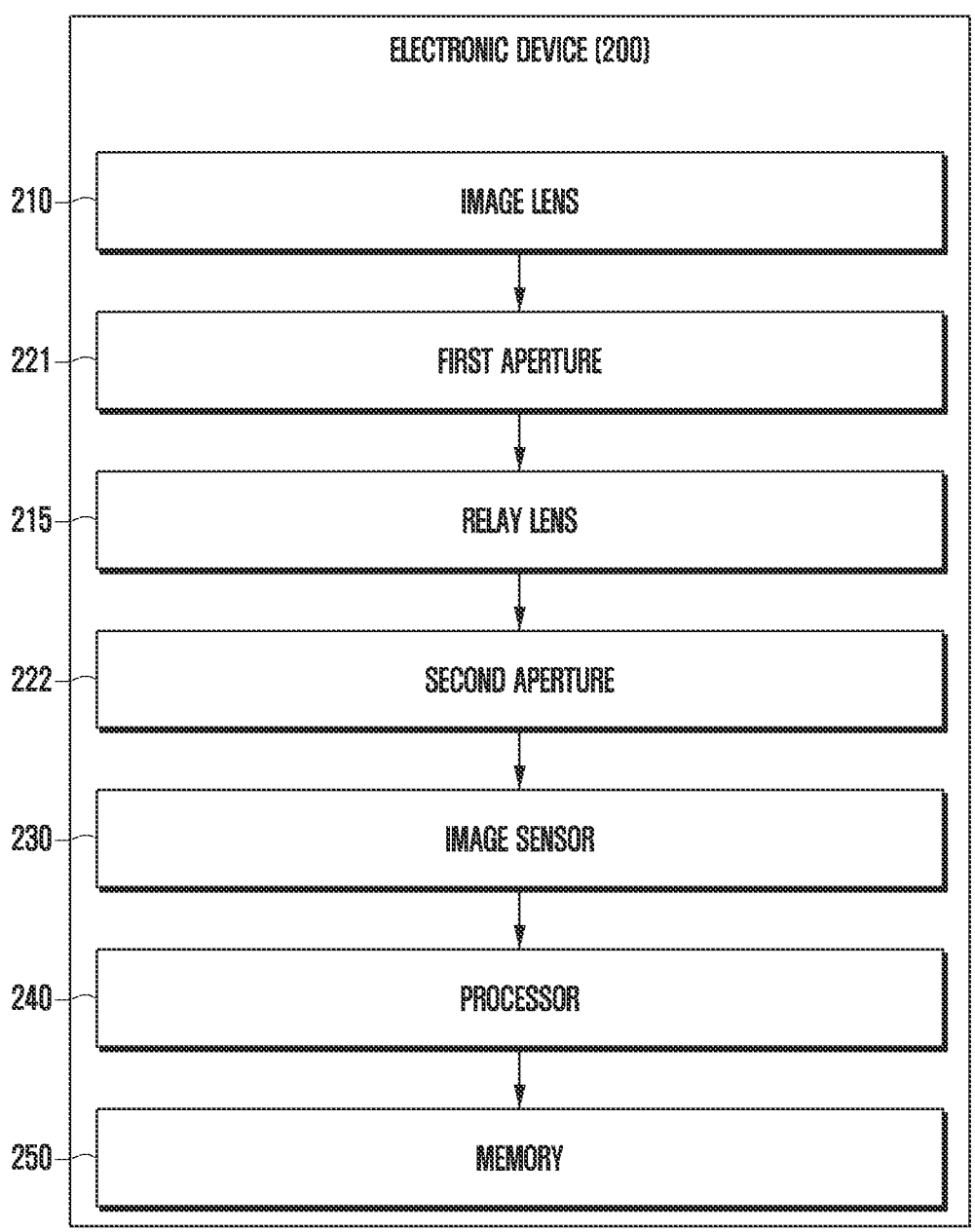
FIG. 2 is a block diagram of an electronic device according to an embodiment of the disclosure.

FIG. 2 is a block diagram of an electronic device according to an embodiment of the disclosure.

Referring to FIG. 2, an electronic device 200 may include an image lens 210, a first aperture 221, a relay lens 215, a second aperture 222, an image sensor 230, a processor 240, and a memory 250.

Light, which is emitted from a light source toward an object, may be reflected by the object and then may be re-incident into the electronic device 200. The reflected light may pass through the image lens 210 and then may be incident to the first aperture 221. The first aperture 221 may be disposed under the image lens 210, and may be disposed at a position, at which the image lens 210 forms an image, for example, at position at which the image sensor 230 is positioned instead of the lower end, in an embodiment.

According to an embodiment, the first aperture 221 may be configured to block light components scattered via a display panel (not shown). The light components having passed through the first aperture 221 may be re-collected through the relay lens 215. The collected light components may form an image on the image sensor 230. The first aperture 221 may be positioned on a first surface between the image lens 210 and the image sensor 230 so as to block light components scattered on the display panel. The relay lens 215 may be positioned between the first surface and the image sensor 230 to collect light having passed through the first aperture 221 to the image sensor 230. Through this process, the relay lens 215 may re-form a fingerprint image, which is formed at the position of the first aperture 221, at the position of the image sensor 230.

According to an embodiment, when the relay lens 215 has a single form other than an array form in which at least one lens is disposed, the electronic device 200 may not include the second aperture 222.

According to an embodiment, the image lens 210 may be configured to collect light emitted from a subject that is a target of image photographing. The image lens 210 may include one or more lenses. According to an embodiment, the electronic device 200 may include at least one the image lens 210. Some of the at least one image lens 210 may have the same lens property (e.g., a view angle, a focal distance, an auto-focus, an f number, or an optical zoom), or at least one image lens 210 may have one or more lens properties different from lens properties of other image lenses 210. For example, the image lens 210 may include a wide-angle lens or a telephoto lens.

According to various embodiments, the electronic device 200 may be configured to acquire fingerprint information of a user by using a biometric sensor (e.g., a fingerprint sensor). For example, the biometric sensor may include an image sensor 230 disposed under at least a partial area of the display panel (not shown) of the electronic device 200. The display panel (not shown) may include multiple pixels, and at least some of the multiple pixels may be configured to output light, which is used to acquire fingerprint information, to the outside. For example, when an external object (e.g., a finger), by a user, comes into contact with an upper transparent member of a display, light output from the multiple pixels may be reflected by the external object and then may be input to the image sensor 230. For example, the image sensor 230 may be configured to acquire an image corresponding to the external object (e.g., a finger fingerprint), based at least on the reflected light. For example, the corresponding image may include fingerprint information.

According to various embodiments, the image sensor 230 may be configured to acquire fingerprint information of a user. The image sensor 230 may be implemented as an optical fingerprint sensor capable of acquiring a fingerprint image, but may not be limited thereto. The fingerprint information, which is acquired from the image sensor 230, may be stored as image information, and may be used for authentication of the electronic device 200 through comparison with pre-registered fingerprint information. The image sensor 230 may be formed in at least one area under the display. Accordingly, when a touch input by using the finger of a user occurs on a cover window of the display, a touch sensor (not shown) may acquire touch information, and at least partially at the same time, the image sensor 230 may acquire image information.

The image sensor 230 may be implemented as a semiconductor chip or a semiconductor package and may be attached to one surface of the display panel. The image sensor 230 may be implemented as at least one of a CMOS image sensor (CIS), a charge coupled device (CCD), a thin film transistor (TFT), and an organic thin film transistor (TFT), and may include a pixel array including multiple sensing pixels (PXS) (i.e., a light-receiving pixel). The pixel array may be implemented as a semiconductor chip or a semiconductor layer on which multiple photoelectric conversion elements (e.g., a photodiode, a phototransistor, a photogate, a pinned photodiode, etc.) are formed.

When fingerprints are placed on a window glass of the display panel, the light from an OLED in the display panel may become a light source to be delivered to user fingerprints and then scattered and reflected, and the scattered reflected light may pass through a substrate of the display panel and then may be delivered to a pixel array of the image sensor 230. The sensing pixels (PXS) may be configured to sense light scattered and reflected by different areas of fingerprints, and may be configured to generate an electric signal corresponding to the sensed light. Each of the sensing pixels (PXS) may be configured to generate an electrical signal corresponding to light scattered and reflected on the ridges of fingerprints, or may be configured to generate an electrical signal corresponding to light scattered and reflected on the valleys between the ridges. The amount of light sensed by the photodiode may vary according to the shape of the reflected fingerprints, and electric signals having different levels may be generated according to the sensed light amount. That is, electrical signals from the multiple sensing pixels (PXS) each may include contrast information (or image information), the processor 240 may be configured to determine whether an area corresponding to each of the sensing pixels (PXS) is a ridge or a valley by using the electrical signals. The image sensor 230 may form an overall fingerprint image by combining the determined information.

According to an embodiment, the image sensor 230 may be configured to convert light, which is emitted or reflected from a subject and then delivered through the image lens 210, into an electrical signal so as to acquire an image corresponding to the subject. For example, the image sensor 230 may include one image sensor 230 selected among image sensors having different properties such as a red-green-blue (RGB) sensor, a black and white (BW) sensor, an infrared (IR) sensor, or an ultraviolet ray (UV) sensor, multiple image sensors 230 having the same property, or multiple image sensors 230 having different properties. In addition, the image sensor 230 may be implemented as at least one of a CMOS image sensor (CIS), a charge coupled device (CCD), a thin film transistor (TFT), and an organic thin film transistor (TFT). According to an embodiment, the electronic device 200 may include at least one image sensor 230 including a lens of a single view angle.

According to various embodiments, the processor 240 may be configured to process data input to the image sensor 230 or data stored in the memory 250. In addition, images processed by the processor 240 may be provided to an element (e.g., the memory 250) of the electronic device 200.

According to various embodiments, the processor 240 may be configured to be able to perform an operation or a data processing associated with control and/or communication of each element of the electronic device 200, and may include at least a part of the elements of the processor 120 of FIG. 1. The processor 240 may be electrically connected to internal elements of the electronic device 200 as well as the image sensor 230.

The memory 250 may be configured to temporarily or permanently store non-limited digital data, and may include at least one of the elements of the memory 130 of FIG. 1. The memory 250 may include a volatile memory and a non-volatile memory. The non-volatile memory may include at least one of a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, a NOR flash, or the like), a hard drive, or a solid state drive (SSD), and the volatile memory may include at least one of a dynamic random access memory (RAM) (DRAM), a static RAM (SRAM), or a synchronous dynamic RAM (SDRAM).

The memory 250 may be configured to store various instructions which can be executed by the processor 240. The instructions may include control commands such as arithmetic and logical operations, data movements, inputs/outputs which can be recognized by the processor 240, and may be defined on a framework stored in the memory 250.

Figure 3:
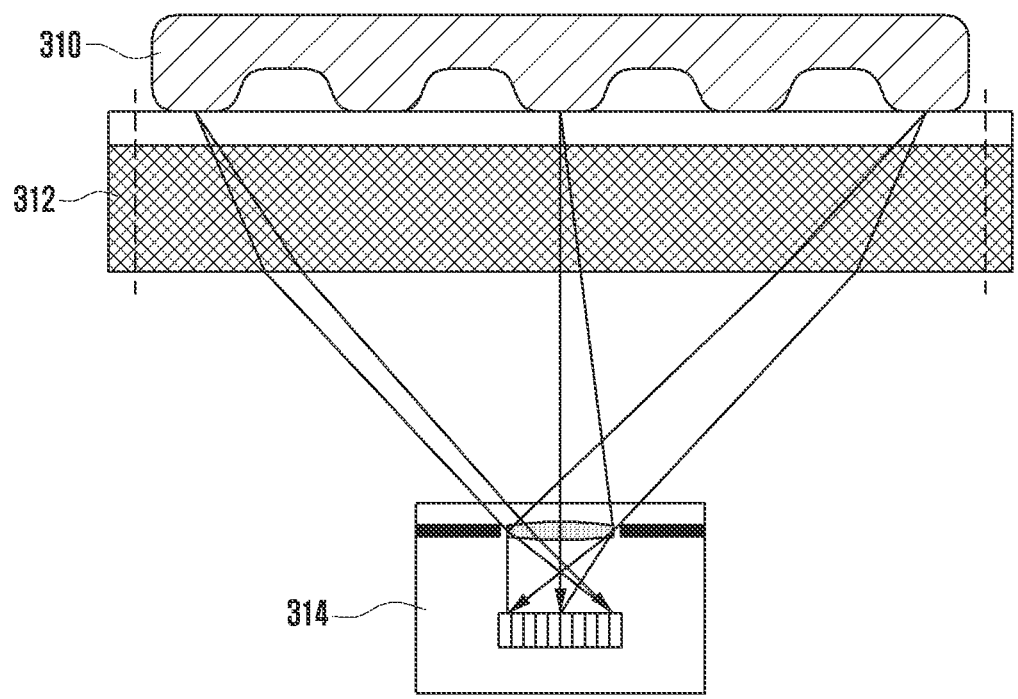
FIG. 3 shows an image acquisition process of an electronic device according to an embodiment of the disclosure.
Figure 3:
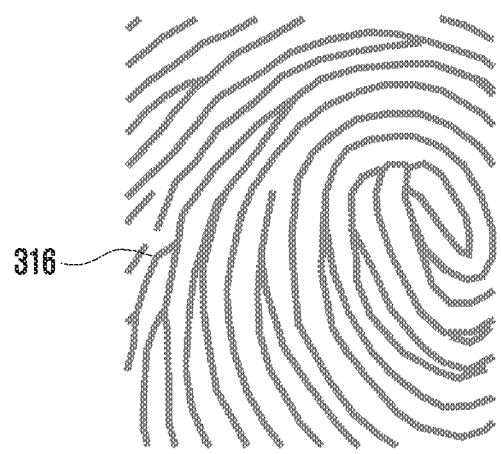

FIG. 3 shows an image acquisition process of an electronic device according to an embodiment of the disclosure.

Referring to FIG. 3, light reflected from an external object 310 may pass through a glass 312 and then may be incident into an image sensor 314 via an image lens 313. Since the glass 312 has no scattering properties and has a low light absorptivity, the image 316 of fingerprints, which is acquired via the glass 312, may have a state maintained ideally clean.

Figure 4:
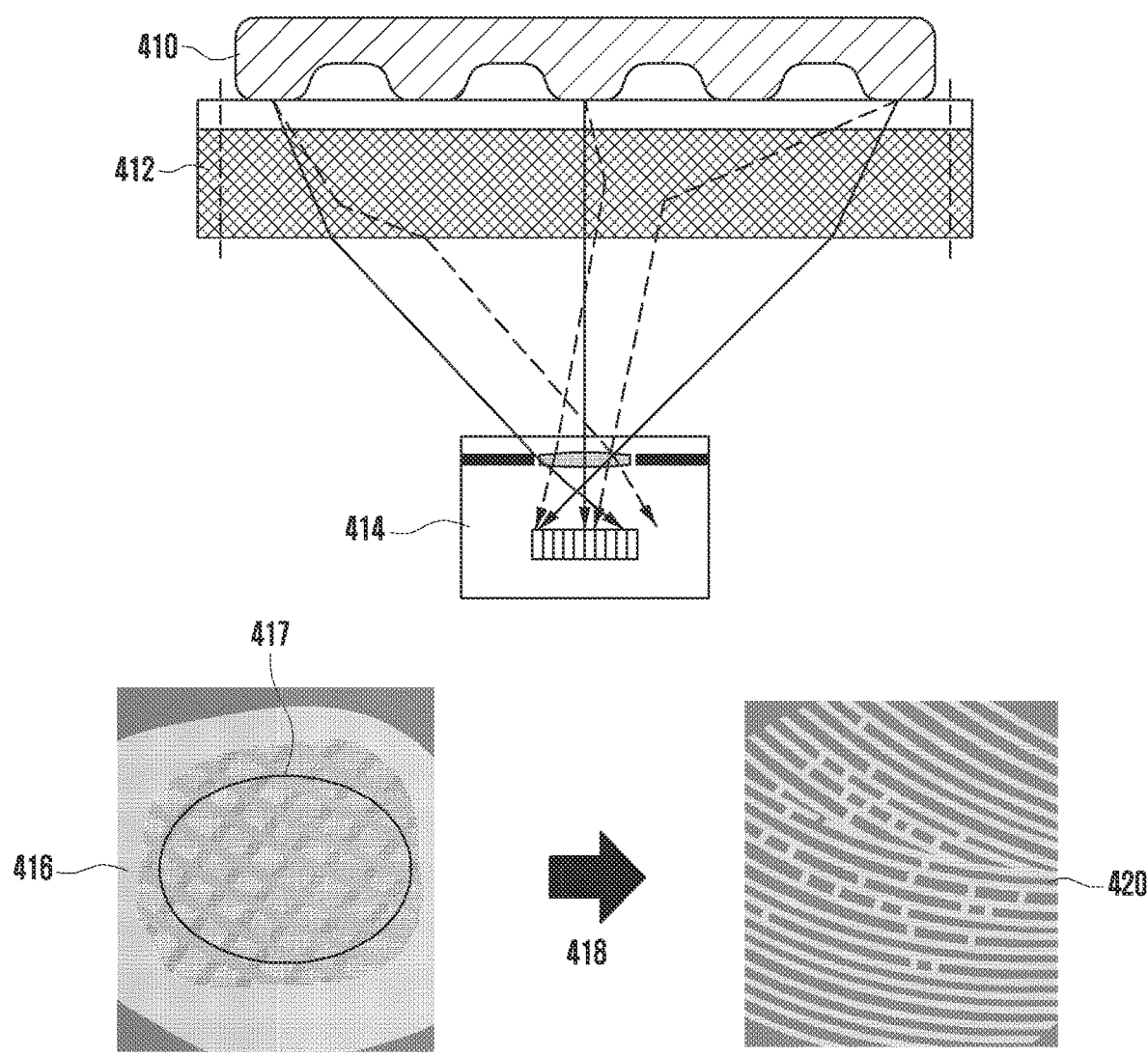
FIG. 4 shows an image acquisition process of an electronic device according to an embodiment of the disclosure.

FIG. 4 shows an image acquisition process of an electronic device according to an embodiment of the disclosure.

Referring to FIG. 4, light reflected from an external object 410 may pass through a display panel 412 and then may be incident into an image sensor 414 via an image lens 413. Since the display panel 412 has a low transmittance of about 2-4% and has strong scattering properties, when an image is acquired, an image including a lot of background components of the display panel 412 may be acquired. In this case, an acquired fingerprint image 416 may include a lot of background components (e.g., in background image 417), and thus noise may be present in the image. A processor (e.g., the processor 240 of FIG. 2) may be configured to perform a background removal process 418 with respect to the fingerprint image 416. The processor 240 may be configured to perform the background removal process 418 and the following image processing so as to acquire an ideally clean image 420.

However, the background removal process 418 may be difficult to be completely performed due to various causes (e.g., physical movements of a fingerprint sensor module and lower parts, physical/optical changes of the display panel 412, changes of a sensor operating environment such as temperature/humidity, changes of an optical property of a display light source). Due to this, incompletely, the background image 417 acquired while the electronic device 200 is used may include noise. When the background image 417 is incompletely removed, and specific components of the display panel 412 remain in the acquired image, it may be difficult for the processor 240 to perform an accurate fingerprint recognition.

The electronic device 200 according to the document may be designed such that only light components reflected from the external object 410 are used to generate a fingerprint image by structurally removing the components scattered on the display panel 412. Through this design, the electronic device 200 may be configured to completely remove the background image 417 and perform an accurate fingerprint recognition process. Hereinafter, the structure of the electronic device 200, which structurally removes components scattered on the display panel 412, will be described.

Figure 5:
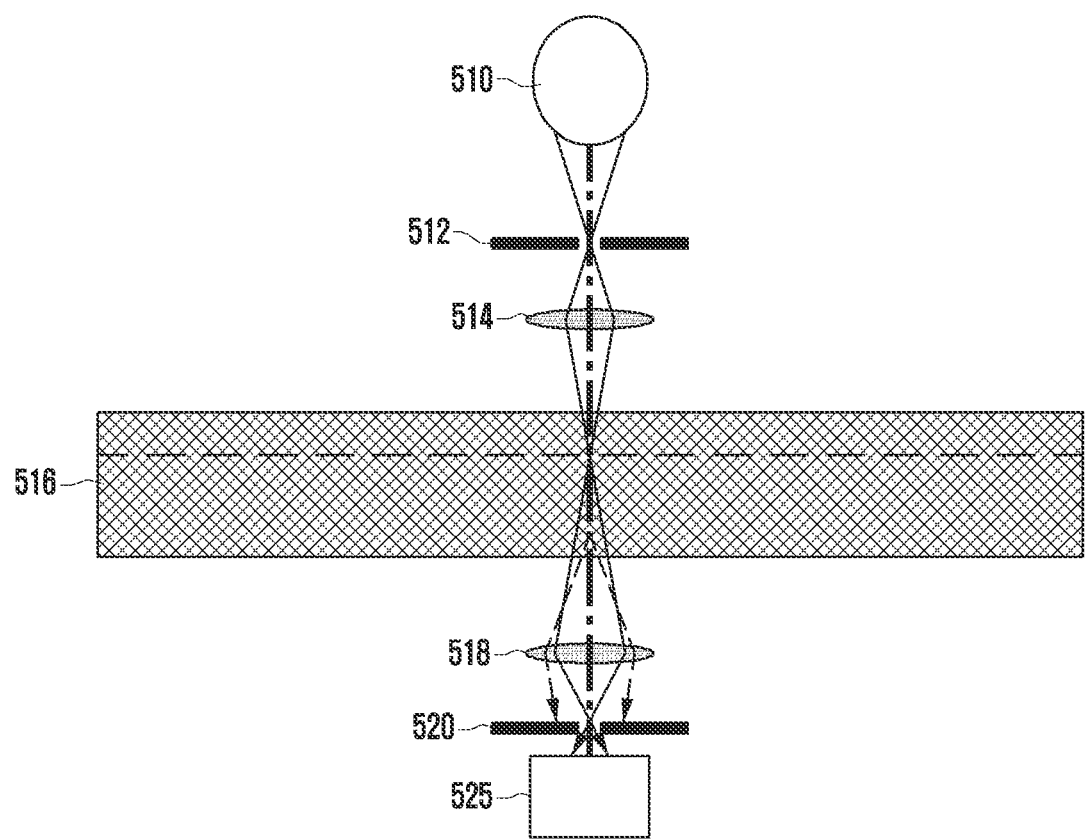
FIG. 5 shows a noise component removal process in connection with forming a fingerprint image according to an embodiment of the disclosure.

FIG. 5 shows a noise component removal process in connection with forming a fingerprint image according to an embodiment of the disclosure.

Referring to FIG. 5, only components, which is directed in a predetermined direction of light emitted from a light source 510, may pass through a first aperture 512 above a target plane 516. Light having passed through the first aperture 512 above the target plane 516 may be collected through a first lens 514 (e.g., a condenser lens) to be emitted onto the target plane 516 on which an object is placed. Light having passed through the target plane 516, on which an object is placed, may pass through a second lens 518 (e.g., image lens) and then be collected. Only the components of the collected light components, which are incident at a specific angle and position, may pass through the second lens 518 and a second aperture 520, and then may be incident to a detector 525. However, remaining components scattered on a plane other than the target plane 516 may be blocked by the second aperture 520 under the target plane 516. Here, the first lens 514 may be positioned under the second lens 518 to collect light having passed through the first aperture 512, and for example, may include a condenser lens. The condenser lens may be configured to control the light source 510 so as to collect light onto the target plane 516. Here, the second lens 518 may be positioned under the first lens 514 to collect light having passed through the target plane 516 on which an object is placed, and for example, may include an image lens.

An electronic device (e.g., the electronic device 200 of FIG. 2) according to the document may be designed such that structurally, only light components reflected from an external object (e.g., the external object 410 of FIG. 4) are used to generate a fingerprint image, by using the second aperture 520 under the target plane 516, which is configured to block unnecessary components.

Figure 6A:
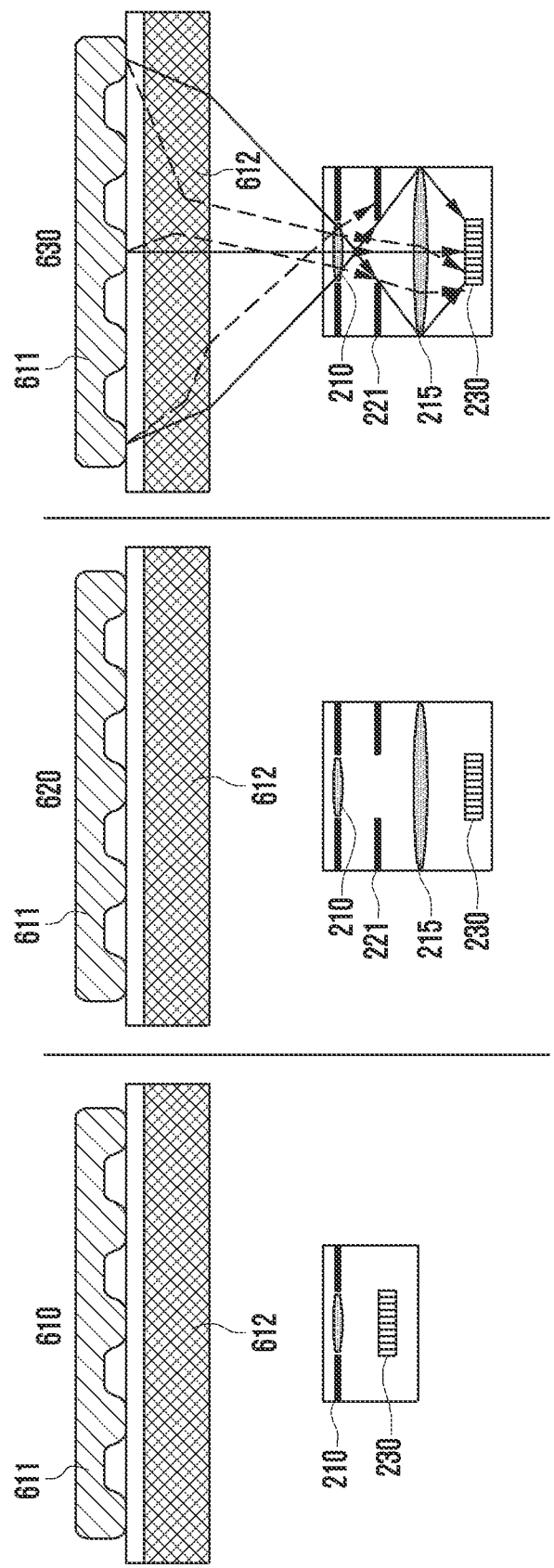
FIG. 6A illustrates the structure of a fingerprint sensor of an electronic device according to an embodiment of the disclosure.

FIG. 6A illustrates the structure of a fingerprint sensor of an electronic device according to an embodiment of the disclosure.

Referring to FIG. 6A, according to drawing 610, an electronic device according to an embodiment may include a first lens (e.g., the image lens 210) and the image sensor 230. Hereinafter, it will be described under the assumption that the first lens (e.g., the image lens 210) is the image lens 210, but the type of a lens may not be limited thereto. Light reflected from an external object 611 and light scattered on a display panel 612 may be collected through the first lens (e.g., the image lens 210) and may be incident to the image sensor 230. The image sensor 230 may be configured to generate a fingerprint image by using the incident light components, and an inaccurate fingerprint image may be generated due to light components scattered on the display panel 612.

According to drawing 620, an electronic device (e.g., the electronic device 200 of FIG. 2) may further include the first aperture 221 and a second lens (e.g., relay lens 215) in addition to a first lens (e.g., the image lens 210) and the image sensor 230. Differently from an electronic device according to an embodiment, the electronic device 200 may include the first aperture 221 in an area at which the image sensor 230 is positioned. The first aperture 221 may be configured to function as a filter for filtering out remaining light components other than necessary components. The light components having passed through the first aperture 221 may pass through a second lens (e.g., the relay lens 215) positioned on the rear surface of the first aperture 221 and then may be incident to the image sensor 230. The relay lens 215 may be configured to collect light components having passed through the first aperture 221 to the image sensor 230. At this time, the first aperture 221 may be positioned on a first surface on which a first lens (e.g., the image lens 210) forms a fingerprint image and may be positioned between a first lens (e.g., the image lens 210) and a second lens (e.g., relay lens 215) so as to block light components scattered on the display panel 612.

Drawing 630 shows a process in which light components are incident to the image sensor 230. The illustrated dotted line and solid line may indicate light components reflected from the external object 611. In the case of both the illustrated dotted line and solid line, light is reflected from the external object 611, but in the case of the dotted line, light may have a changed light path by passing through and scattering on the display panel 612. As illustrated by the dotted line, the light components scattered on the display panel 612 may be partially blocked while passing through the first aperture 221 and thus may not be changed into a noise signal. Alternatively, as illustrated by the dotted line, the light components scattered on the display panel 612 may have a changed light path while passing through the second lens (e.g., the relay lens 215), and thus may reach outside the area of the image sensor 230 and may not be changed into a noise signal on the image sensor 230. The electronic device 200 may be configured to remove light components (e.g., the light components illustrated by the dotted line) scattered on the display panel 612 by using the first aperture 221 and the second lens (e.g., the relay lens 215), and thus to generate a clearer fingerprint image by using, as much as possible, light components (e.g., the light components illustrated by the solid line) reflected from the external object.

Figure 6B:
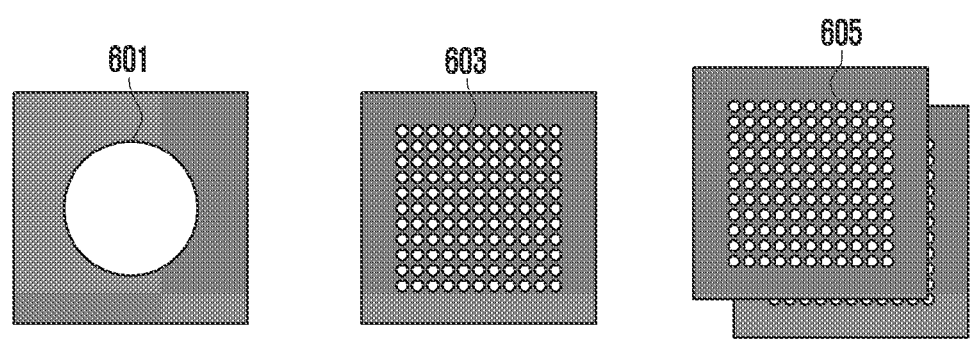
FIG. 6B illustrates the shape of a first aperture according to an embodiment of the disclosure.

FIG. 6B illustrates the shape of a first aperture according to an embodiment of the disclosure.

Referring to FIG. 6B, the first aperture 221 may be disposed in order to remove unnecessary light components, and for example, may have a single large circular shape as illustrated in drawing 601. In this case, the first aperture 221 may be configured to block unnecessary light components incident to the edge area thereof. The first aperture 221 may be formed in the form of a hole array as illustrated in drawing 603. The hole array may mean a set of individual holes in drawing 603. In an embodiment, each of the holes in drawing 603 included in the hole array of drawing 603 may correspond one-to-one to the position of each pixel of the image sensor 230. When the first aperture 221 is implemented in the form of the hole array, noise blocking efficiency can be improved. The first aperture 221 may be formed of multiple layers as illustrated in drawing 605, which are arranged to overlap. In this case, the first aperture 221 may be configured to finely adjust the angle of incidence of light components incident to the image sensor 230.

Figure 7:
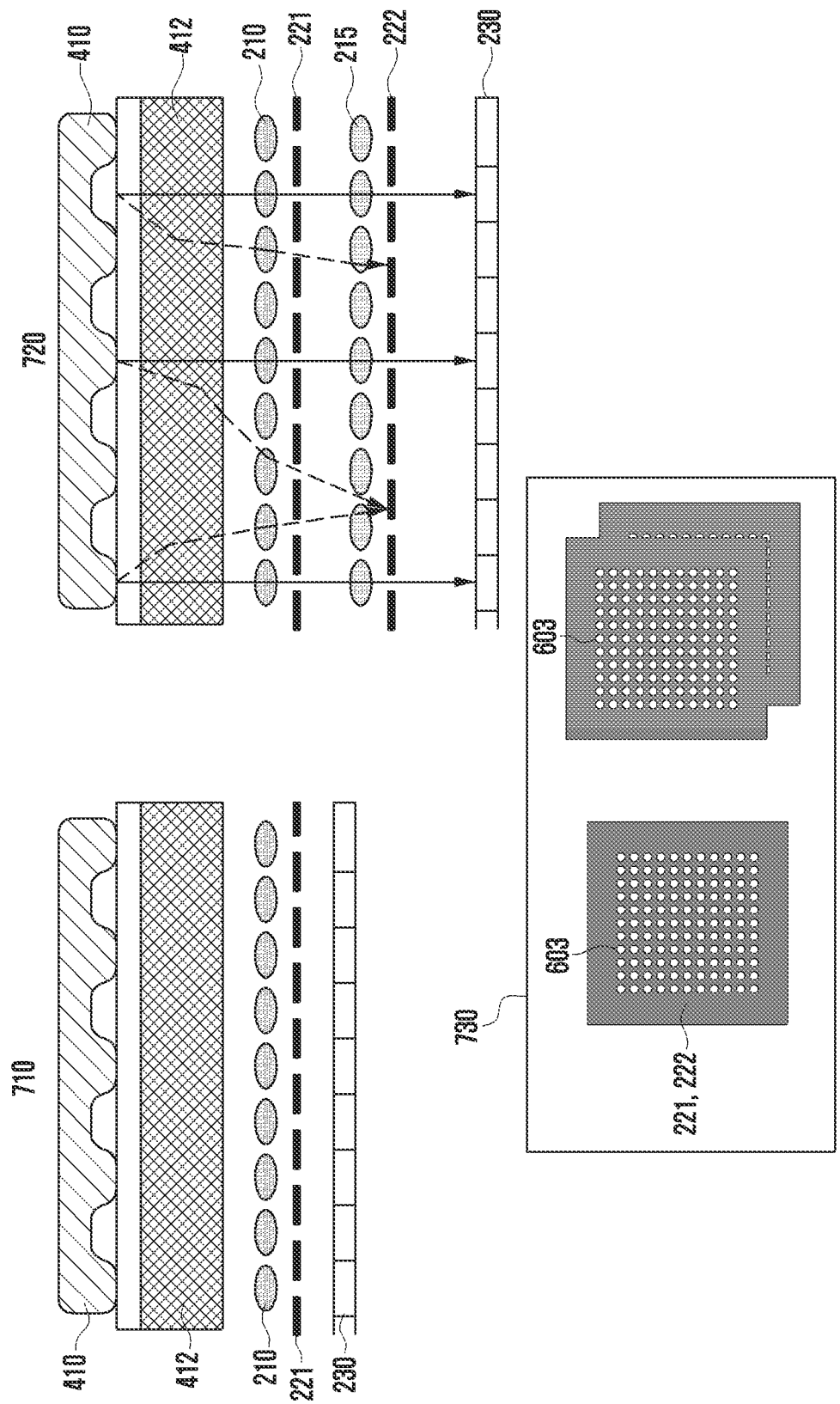
FIG. 7 illustrates the structure of a fingerprint sensor of an electronic device according to an embodiment of the disclosure.

FIG. 7 illustrates the structure of a fingerprint sensor of an electronic device according to an embodiment of the disclosure.

An electronic device (e.g., the electronic device 200 of FIG. 2) according to various embodiments may further include the second aperture 222 in addition to a first lens (e.g., the image lens 210), the first aperture 221, a second lens (e.g., the relay lens 215), the image sensor 230. The first aperture 221 may be positioned on the first surface between the first lens (e.g., the image lens 210) and the image sensor 230 so as to block light components scattered on a display panel (e.g., the display panel 412 of FIG. 4). The second lens (e.g., the relay lens 215) may be positioned between the first surface and the image sensor 230 to collect light having passed through the first aperture 221 to the image sensor 230. Through this process, the second lens (e.g., the relay lens 215) may re-form a fingerprint image, which is formed at the position of the first aperture 221, at the position of the image sensor 230. The second aperture 222 may be positioned between the second lens (e.g., the relay lens 215) and the image sensor 230 so as to block light components scattered on the display panel 412.

Referring to FIG. 7, according to drawing 710, an electronic device according to an embodiment may be configured to filter out light components directed to the image sensor 230 by using one first lens (e.g., the image lens 210) and one aperture (e.g., first aperture 221). According to drawing 720, the electronic device 200 may be configured to filter out light components among light components (the portion illustrated by the solid line) reflected from the finger of a user or the external object 410 and light components (the portion illustrated by the dotted line) scattered on the display panel 412, which are directed to the image sensor 230, by using the first lens (e.g., the image lens 210), the second lens (e.g., the relay lens 215), the first aperture 221, and the second aperture 222. The first lens (e.g., the image lens 210), the second lens (e.g., the relay lens 215), the first aperture 221, and the second aperture 222 have been described through FIG. 2 above.

According to one embodiment, the lower drawing 730 shows the shape of the first aperture 221 and the second aperture 222, and the first aperture 221 and the second aperture 222 may be formed in the form of a hole array. The hole array may mean a set of individual holes in drawing 603. For example, each of the holes in drawing 603 included in the hole array may correspond one-to-one to the position of each pixel of the image lens 210, the relay lens 215, or the image sensor 230. When the first aperture 221 and the second aperture 222 are implemented in the form of a hole array, noise blocking efficiency can be improved. In an embodiment, the first aperture 221 and the second aperture 222 may be formed as multiple layers arranged to overlap. In this case, the first aperture 221 and the second aperture 222 may be configured to finely adjust the angle of incidence of light components incident to the image sensor 230. This is the same as described through FIG. 6B above. As another example, the first lens (e.g., the image lens 210) and the second lens (e.g., the relay lens 215) may also be formed in the form of an array corresponding to the first aperture 221 and the second aperture 222.

Figure 8A:
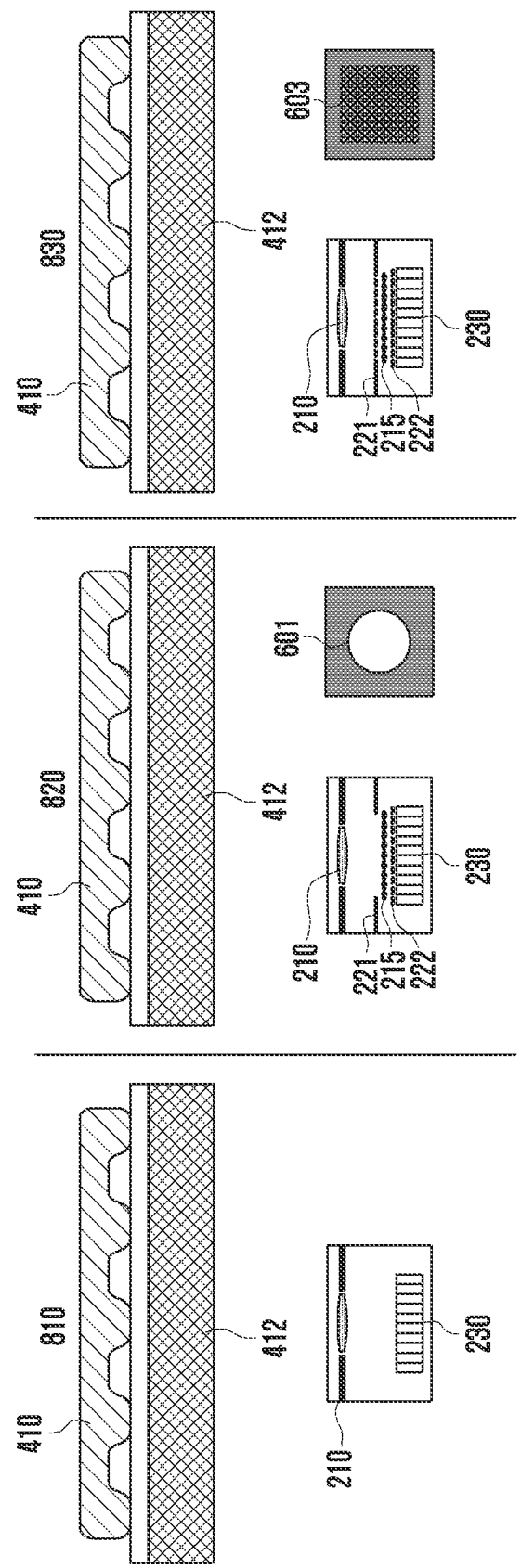
FIG. 8A illustrates the structure of a fingerprint sensor of an electronic device according to an embodiment of the disclosure.

FIG. 8A illustrates the structure of a fingerprint sensor of an electronic device according to an embodiment of the disclosure.

Referring to FIG. 8A, an electronic device 810 according to an embodiment may include a first lens (e.g., the image lens 210) and the image sensor 230. Light reflected from an external object and light scattered on a display panel may be collected through the first lens (e.g., the image lens 210) to be incident to the image sensor 230. The image sensor 230 may be configured to generate a fingerprint image by using incident light components, and an inaccurate fingerprint image may be generated due to light components scattered on the display panel.

An electronic device 820 and 830 according to various embodiments may further include the first aperture 221, a second lens (e.g., the relay lens 215), and the second aperture 222 in addition to a first lens (e.g., the image lens 210) and the image sensor 230. Differently from the electronic device 810 according to an embodiment, in the case of the electronic device 820 and 830 according to the document, the first aperture 221 may be positioned in an area in which the image sensor 230 is positioned or in an area in which the image sensor 230 forms a fingerprint image, and the image sensor 230 may be positioned under the first aperture 221. Here, the first aperture 221 may be configured to function as a filter for filtering out remaining light components other than necessary components. The light components having passed through the first aperture 221 may pass through the second lens (e.g., relay lens 215) positioned on the rear surface of the first aperture 221, and may pass through the second aperture 222 and then may be incident to the image sensor 230. The relay lens 215 may be configured to project an image generated by passing through the first aperture 221 onto a plane on which the second aperture 222 is positioned. The second aperture 222 may be configured to filter out some of noise components thereof and then collect the passed light components to the image sensor 230.

According to an embodiment, the first aperture 221 and the second aperture 222 may be formed in the form of a hole array. For example, the hole array may mean a set of individual holes in drawing 603. In an embodiment, each of the holes in drawing 603 included in the hole array may correspond one-to-one to the position of each pixel of the image sensor 230. When the first aperture 221 and the second aperture 222 are implemented in the form of the hole array, noise blocking efficiency can be improved. In an embodiment, the first aperture 221 and the second aperture 222 may be formed as multiple layers arranged to overlap. In this case, the first aperture 221 and the second aperture 222 may be configured to finely adjust the angle of incidence of light components incident to the image sensor 230. As another example, the electronic device 820 may include the first aperture 221 having the single large circular shape 601, and the electronic device 830 may include the first aperture 221 having a hole array of which the shape is a set of individual holes in drawing 603.

FIG. 8B illustrates, as a cross-sectional view, the structure of an electronic device according to an embodiment of the disclosure.

The electronic device 830 according to various embodiments may further include the second aperture 222 in addition to a first lens (e.g., the image lens 210), the image sensor 230, the first aperture 221, and a second lens (e.g., the relay lens 215). The shapes of the first aperture 221 and the second aperture 222 may be the same as those described through FIGS. 6B and 8A above.

Referring to FIG. 8B, with reference to a cross section therein, the electronic device 830 may include elements in the order of the first aperture 221, a second lens (e.g., the relay lens 215), the second aperture 222, and the image sensor 230. Each of the elements may be aligned as illustrated in FIG. 8B, and the electronic device 820 and 830 may include the first aperture 221 having a different shape as previously described through FIG. 8A. Here, although it is described under the assumption that the number of apertures is one or two, the number of apertures, which is associated with a fine adjustment of angle of incidence of light components, may not be limited thereto. However, it may be difficult for an electronic device (e.g., the electronic device 200 of FIG. 2) to include a greater number of apertures due to thickness constraint. Hereinafter, FIGS. 9 and 10 illustrate a structure of the electronic device 200 for overcoming the thickness constraint.

Figure 9:
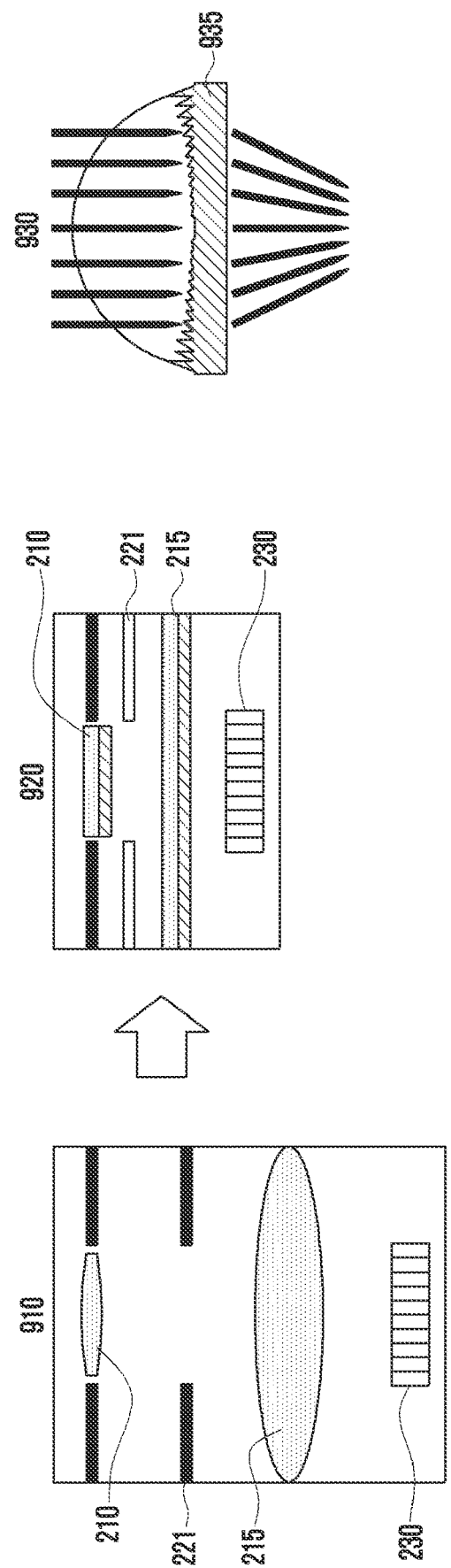
FIG. 9 shows an inner lens structure of an electronic device according to an embodiment of the disclosure.
Figure 10:
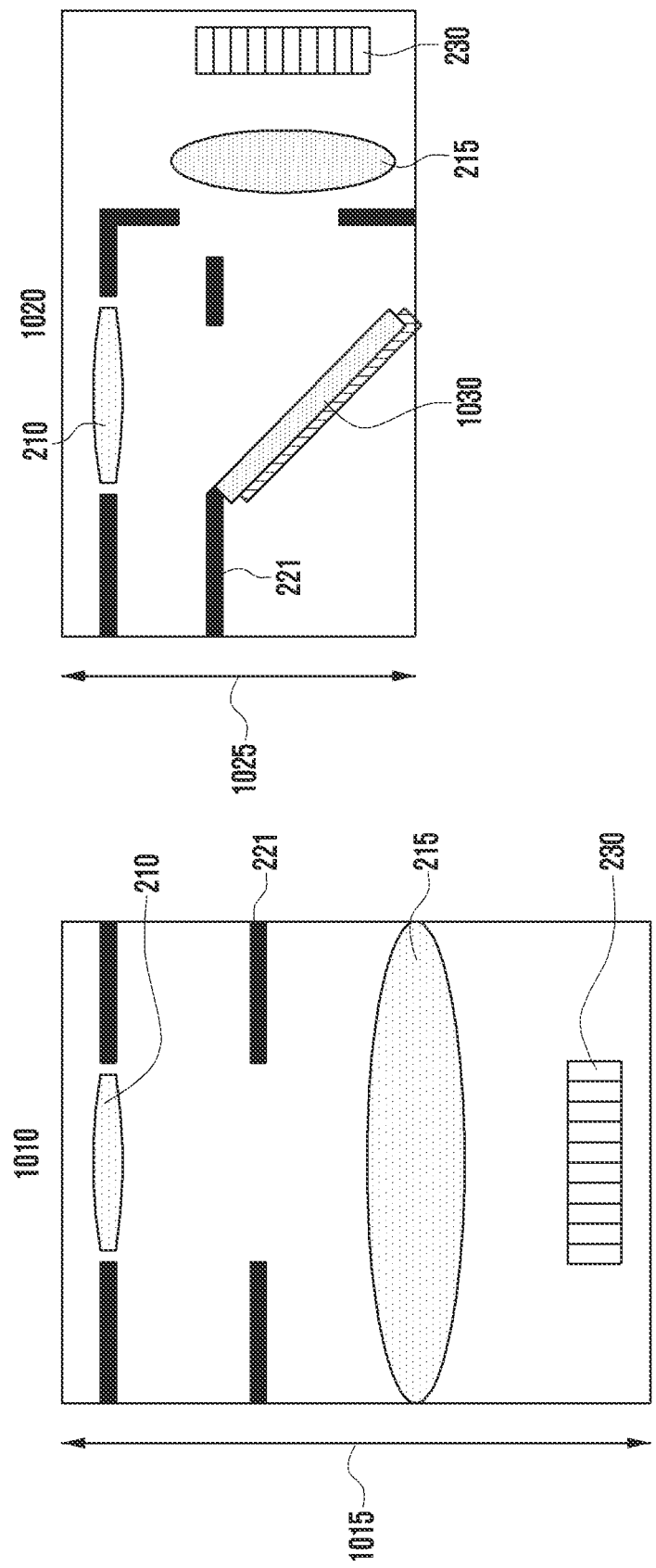
FIG. 10 shows an inner lens structure of an electronic device according to an embodiment of the disclosure.

FIG. 9 shows an inner lens structure of an electronic device according to an embodiment of the disclosure.

Referring to FIG. 9, an electronic device 910 according to an embodiment may further include a first lens (e.g., the image lens 210), the first aperture 221, and a second lens (e.g., the relay lens 215), and thus may have a relatively thick thickness. An electronic device 920 according to an embodiment may be configured to replace at least one of a first lens (e.g., the image lens 210) or a second lens (e.g., relay lens 215) with a Fresnel lens, and thus the electronic device 920 may have a relatively thin thickness. Drawing 930 shows a shape in which light is collected in a Fresnel lens 935. According to drawing 930, in the case of the Fresnel lens 935, differently from a convex lens, a lot of grooves are formed on a flat transparent plate. Therefore, it may be identified that light is refracted in the grooves. The refracted light may be focused to one point, and the Fresnel lens 935 may collect light instead of using a thick convex lens by using the principle.

Generally, the Fresnel lens 935 may be a type of condenser lens, and may mean a lens which has a function of focusing light as a convex lens and can reduce the thickness thereof. The Fresnel lens 935 may have a lens structure having a shape of multiple separate straps, and each of straps may be configured to have a prism action. Therefore, the Fresnel lens may have a small aberration to perform a function of collecting light. A clear image may be formed when the central part of a lens is used. However, in the case of an image formed when both the central part and the perimeter end of a lens are used, the image may be blurred or distorted. An aberration may mean a phenomenon in which a difference in the formed image occurs depending on a used position of a lens.

FIG. 10 shows an inner lens structure of an electronic device according to an embodiment of the disclosure.

An electronic device 1010 according to an embodiment may further include the first aperture 221 and a second lens (e.g., the relay lens 215), and thus may have a relatively thick thickness. An electronic device 1020 according to an embodiment may include a mirror 1030 between a first lens (e.g., the image lens 210) and a second lens (e.g., the relay lens 215) to reduce the overall thickness of the electronic device 1020.

Referring to FIG. 10, the electronic device 1020 according to an embodiment may be configured to change the direction of light incident in the vertical axis direction to the horizontal axis direction by using the mirror 1030. If the progressing direction of light is changed using the mirror 1030, the electronic device 1020 may not be thickened in the vertical axis direction, and thus may be configured to minimize the increase in the overall thickness thereof by dividing the increase in the thickness thereof to an increase in the horizontal axis direction and an increase in the vertical axis direction. For example, the electronic device 1010 according to an embodiment may have a thick thickness in the vertical axis direction and thus may have a length 1015 in vertical axis direction. In the case of the electronic device 1020 according to an embodiment, by using the mirror 1030, the electronic device 1020 may be configured to reduce the length in the vertical axis direction by increasing the length in the horizontal axis direction. The electronic device 1020 may have a vertical axis length 1025, and thus it may be identified that the vertical axis length 1025 is relatively shorter than the vertical axis length 1015 of the electronic device 1010.

Figure 11:
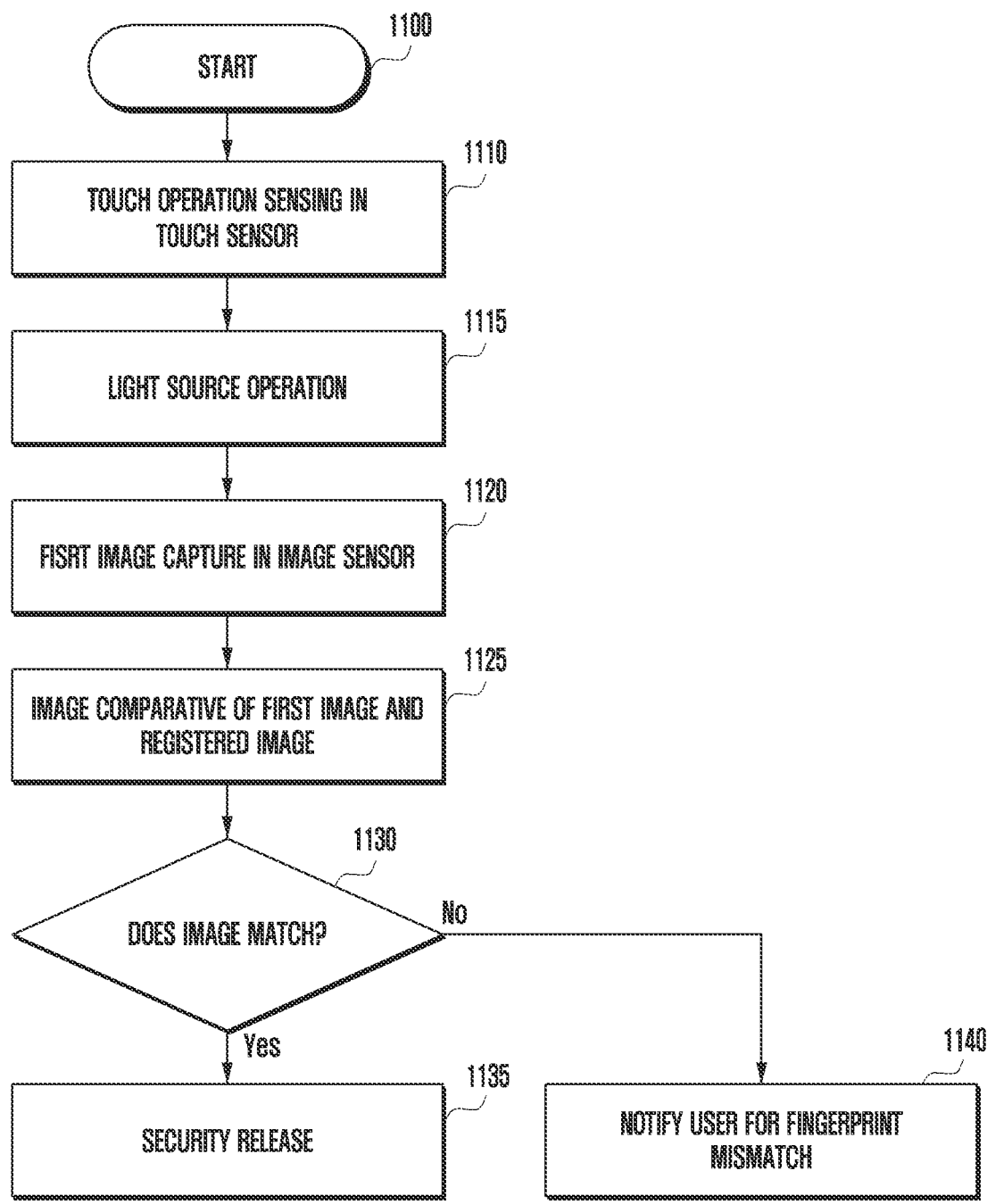
FIG. 11 shows, as a flowchart, a fingerprint recognition operation of an electronic device including a fingerprint sensor according to an embodiment of the disclosure.

FIG. 11 shows, as a flowchart, a fingerprint recognition operation of an electronic device including a fingerprint sensor according to an embodiment of the disclosure.

A fingerprint recognition operation may be performed through the electronic device of FIGS. 1 to 5, 6A, 6B, 7, 8A, 8B, 9, and 10.

Referring to FIG. 11, the method may start at 1100. In operation 1110, an electronic device (e.g., the electronic device 200 of FIG. 2) may sense a touch operation by using a touch sensor. In operation 1115, a processor (e.g., the processor 240 of FIG. 2) may operate a light source so as to emit light toward an object on the touch sensor when a touch operation is detected. Light reflected from an external object may be incident to an image sensor (e.g., the image sensor 230 of FIG. 2). At this time, in addition to the light reflected from the external object, when light scattered while passing through a display panel is also incident to the image sensor 230, noise may be included in the generated fingerprint image.

According to various embodiments, the electronic device 200 may be configured to block light scattered while structurally passing through a display panel so that only light reflected from an external object forms a fingerprint image. The structure of the electronic device 200, which blocks light scattered while structurally passing through the display panel, has been described through to FIGS. 4, 5, 6A, 6B, 7, 8A, and 8B above.

In operation 1120, the image sensor 230 may capture (generate) a first image by using incident light. In operation 1125, the processor 240 may compare the generated first image with a user fingerprint image registered (stored) in a memory (e.g., the memory 250 of FIG. 2).

In operation 1130, when the user fingerprint image and the generated first image match, in operation 1135, the processor 240 may release the security of the electronic device 200. When the user fingerprint image and the generated first image do not match, in operation 1140, the processor 240 may deliver a notification that the fingerprints do not match. When the fingerprint mismatch exceeds a certain number of times while the notification is repeatedly performed, the processor 240 may end the fingerprint recognition process, may enhance a security, and then may request a user for another security release method (e.g., a pattern or an iris recognition). Here, the matching of fingerprints may not mean that the user fingerprint image and the generated first image should correspond to 100%, and a ratio (e.g., about 90%) recognized as the matching of fingerprints may be set in the production process of the electronic device 200.

According to various embodiments, an electronic device 200 may include a display panel, an image lens 210 positioned under the display panel to form a fingerprint image by using light reflected from user fingerprints, an image sensor 230 configured to convert an image into an electrical signal, a first aperture 221 positioned on a first surface between the image lens 210 and the image sensor 230 to block light components scattered on the display panel, a relay lens positioned between the first surface and the image sensor to collect light having passed through the first aperture 221 to the image sensor 230, and a second aperture 222 positioned on a second surface between the relay lens 215 and the image sensor 230 to block light components scattered on the display panel.

According an embodiment, the first aperture may be positioned on the first surface on which the image lens forms a fingerprint image and may be positioned between the image lens and the relay lens so as to block light components scattered on the display panel.

According an embodiment, the first aperture may include at least one of a single large circular shape or a shape including multiple hole arrays.

According an embodiment, the first aperture may be configured to be formed on a single plane or on at least two planes.

According an embodiment, at least one of the image lens or the relay lens may have a Fresnel lens shape.

According an embodiment, the electronic device may further include a mirror, wherein the mirror may be positioned between the first aperture and the relay lens such that light having passed through the first aperture passes through the relay lens.

According an embodiment, the second aperture may be positioned on the second surface on which a shape created on the first surface, on which the first aperture is positioned, is formed as a fingerprint image via the relay lens, and may be positioned between the relay lens and the image sensor so as to block light components scattered on the display panel.

According an embodiment, the second aperture may include at least one of a single large circular shape or a shape including multiple hole arrays.

According an embodiment, the second aperture may be configured to be formed on a single plane or on at least two planes.

According an embodiment, the electronic device may further include a memory configured to store user fingerprints, and a processor operatively connected to the image sensor and the memory, wherein the processor may be configured to compare the user fingerprints stored in the memory and an image converted into an electrical signal by the image sensor so as to perform a fingerprint recognition process.

According an embodiment, the processor may be configured to release a security lock when the user fingerprints previously stored in the memory and the image converted by the image sensor match, and display, on the display panel, a notification of fingerprint authentication failure and of a re-request for user fingerprint authentication when the user fingerprints previously stored in the memory and the image converted by the image sensor do not match.

According an embodiment, the first aperture may be positioned on the first surface on which the image lens forms a fingerprint image and may be positioned between the image lens and the relay lens so as to block light components scattered on the display panel.

According an embodiment, at least one of the image lens or the relay lens may have a Fresnel lens shape.

According an embodiment, an electronic device may include a display panel, an image lens positioned under the display panel to form a fingerprint image by using light reflected from user fingerprints, an image sensor configured to convert an image into an electrical signal, a first aperture positioned on a first surface between the image lens and the image sensor to block light components scattered on the display panel, and a relay lens positioned between the first surface and the image sensor to collect light having passed through the first aperture to the image sensor.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display panel;
an image lens positioned under the display panel to form a fingerprint image by using light reflected from user fingerprints;
an image sensor configured to convert an image into an electrical signal;
a first aperture positioned on a first surface between the image lens and the image sensor to block a light component scattered on the display panel;
a relay lens positioned between the first surface and the image sensor to collect light having passed through the first aperture to the image sensor; and
a second aperture positioned on a second surface between the relay lens and the image sensor to block a light component scattered on the display panel,
wherein the first aperture comprises a single circular hole,
wherein the second aperture comprises a multiple hole array, and
wherein a hole included in the multiple hole array corresponds one-to-one to a position of a pixel of the image sensor.

2. The electronic device of claim 1,
wherein the first aperture is positioned on the first surface on which the image lens forms the fingerprint image, and
wherein the first aperture is positioned between the image lens and the relay lens so as to block a light component scattered on the display panel.

3. The electronic device of claim 1, wherein the first aperture is configured to be formed on a single plane or on at least two planes.

4. The electronic device of claim 1, wherein at least one of the image lens or the relay lens has a Fresnel lens shape.

5. The electronic device of claim 1, further comprising:
a mirror,
wherein the mirror is positioned between the first aperture and the relay lens such that light having passed through the first aperture passes through the relay lens.

6. The electronic device of claim 1,
wherein the second aperture is positioned on the second surface on which a shape created on the first surface, on which the first aperture is positioned, is formed as a fingerprint image via the relay lens, and
wherein the second aperture is positioned between the relay lens and the image sensor so as to block a light component scattered on the display panel.

7. The electronic device of claim 1, wherein the second aperture is configured to be formed on a single plane or on at least two planes.

8. The electronic device of claim 1, further comprising:
a memory configured to store the user fingerprints; and
a processor operatively connected to the image sensor and the memory,
wherein the processor is configured to compare the user fingerprints stored in the memory and the image converted into the electrical signal by the image sensor so as to perform a fingerprint recognition process.

9. The electronic device of claim 8, wherein the processor is configured to:
release a security lock when the user fingerprints previously stored in the memory and the image converted by the image sensor match, and
display, on the display panel, a notification of fingerprint authentication failure and of a re-request for user fingerprint authentication when the user fingerprints previously stored in the memory and the image converted by the image sensor do not match.

10. The electronic device of claim 8,
wherein the first aperture is positioned on the first surface on which the image lens forms the fingerprint image, and
wherein the first aperture is positioned between the image lens and the relay lens so as to block a light component scattered on the display panel.

11. The electronic device of claim 8, wherein at least one of the image lens or the relay lens has a Fresnel lens shape.

12. The electronic device of claim 8, further comprising:
a mirror,
wherein the mirror is positioned between the first aperture and the relay lens such that light having passed through the first aperture passes through the relay lens.

13. The electronic device of claim 8,
wherein the second aperture is positioned on the second surface on which a shape created on the first surface, on which the first aperture is positioned, is formed as a fingerprint image via the relay lens, and
wherein the second aperture is positioned between the relay lens and the image sensor so as to block a light component scattered on the display panel.

14. An electronic device comprising:
a display panel;
an image lens positioned under the display panel to form a fingerprint image by using light reflected from user fingerprints;
an image sensor configured to convert an image into an electrical signal;
a first aperture positioned on a first surface between the image lens and the image sensor to block a light component scattered on the display panel;
a relay lens positioned between the first surface and the image sensor to collect light having passed through the first aperture to the image sensor; and
a second aperture positioned on a second surface between the relay lens and the image sensor to block a light component scattered on the display panel,
wherein the first aperture comprises a single circular hole,
wherein the second aperture comprises a multiple hole array, and
wherein a hole included in the multiple hole array corresponds one-to-one to a position of a pixel of the image sensor.

15. The electronic device of claim 14,
wherein the first aperture is positioned on the first surface on which the image lens forms the fingerprint image, and
wherein the first aperture is positioned between the image lens and the relay lens so as to block a light component scattered on the display panel.

16. The electronic device of claim 14,
wherein the first aperture is configured to be formed on a single plane or on at least two planes.

17. The electronic device of claim 14, wherein at least one of the image lens or the relay lens has a Fresnel lens shape.

18. The electronic device of claim 14, further comprising:
a mirror,
wherein the mirror is positioned between the first aperture and the relay lens such that light having passed through the first aperture passes through the relay lens.

\* \* \* \* \*